(12) United States Patent
Chen et al.

(10) Patent No.: US 7,120,726 B2
(45) Date of Patent: Oct. 10, 2006

(54) VIRTUAL TRACK FOR SERPENTINE TRACK FORMAT

(75) Inventors: HuaYuan Chen, Singapore (SG); YongPeng Chng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 392 days.

(21) Appl. No.: 10/700,094

(22) Filed: Nov. 3, 2003

(65) Prior Publication Data
US 2005/0097267 A1    May 5, 2005

(51) Int. Cl.
*G06F 12/06* (2006.01)
(52) U.S. Cl. .................... 711/4; 711/154; 360/78.08
(58) Field of Classification Search .................... None
See application file for complete search history.

(56) References Cited

U.S. PATENT DOCUMENTS 5,760,993 A * 6/1998 Purkett .................... 360/78.08
6,151,292 A   11/2000 Yoshimoto
6,295,176 B1  9/2001 Reddy
6,408,314 B1  6/2002 Liu
6,470,421 B1  10/2002 Bui
6,535,995 B1 * 3/2003 Dobbek .................... 714/8
2002/0101675 A1 * 8/2002 Chng et al. .................. 360/63

* cited by examiner

*Primary Examiner*—Brian R. Peugh
(74) *Attorney, Agent, or Firm*—John D. Veldhuis-Kroeze; Westman, Champlin & Kelly, P.A.

(57) ABSTRACT

A method of representing a serpentine track accessing format includes obtaining a plurality of head and physical track number pairs in the serpentine track accessing format. Then, each of the head and physical track number pairs are mapped to a unique virtual track number. In some embodiments, the unique the virtual track numbers are in a non-continuous monotonic order. In some embodiments, the unique virtual track numbers are assigned based upon a modulo M which is a function of a maximum number of tracks per physical zone. Translation engines which perform the mapping, as well as data storage systems which include the translation engines, are also disclosed.

16 Claims, 8 Drawing Sheets

Table 1 Physical Zone Table

| Zone Number | Start Cylinder | Physical Sectors per Track |
|---|---|---|
| 0 | 0 | 20 |
| 1 | 4 | 15 |
| 2 | 7 | 10 |
| 3 | 9 | - |

Table 2 Logical Zone Table with Physical Track/Head Representation

| LZ Number | Start Cylinder/Head | Start LBA | Logical Sectors per track |
|---|---|---|---|
| 0 | 0 / 0 | 0 | 20 |
| 1 | 2 / 0 | 40 | 18 |
| 2 | 2 / 1 | 94 | 19 |
| 3 | 0 / 2 | 151 | 15 |
| 4 | 3 / 2 | 196 | 20 |
| 5 | 4 / 3 | 276 | 15 |
| 6 | 6 / 2 | 321 | 13 |
| 7 | 4 / 1 | 360 | 10 |
| 8 | 6 / 0 | 390 | 12 |
| 9 | 7 / 0 | 426 | 10 |
| 10 | 8 / 1 | 446 | 8 |
| 11 | 7 / 2 | 462 | 5 |
| 12 | 8 / 3 | 472 | 9 |
| 13 | 9 / 3 | 490 | - |

| Cylinder / Head | Offset N |
|---|---|
| Zone 0: | |
| Cylinder 0 / head 0 | 0 |
| Cylinder 1 / head 0 | 1 |
| Cylinder 2 / head 0 | 2 |
| Cylinder 3 / head 0 | 3 |
| Cylinder 3 / head 1 | 4 |
| Cylinder 2 / head 1 | 5 |
| Cylinder 1 / head 1 | 6 |
| Cylinder 0 / head 1 | 7 |
| Cylinder 0 / head 2 | 8 |
| Cylinder 1 / head 2 | 9 |
| Cylinder 2 / head 2 | A |
| Cylinder 3 / head 2 | B |
| Cylinder 3 / head 3 | C |
| Cylinder 2 / head 3 | D |
| Cylinder 1 / head 3 | E |
| Cylinder 0 / head 3 | F |
| Zone 1: | |
| Cylinder 4 / head 3 | 0 |
| Cylinder 5 / head 3 | 1 |
| Cylinder 6 / head 3 | 2 |
| Cylinder 6 / head 2 | 3 |
| Cylinder 5 / head 2 | 4 |
| Cylinder 4 / head 2 | 5 |
| Cylinder 4 / head 1 | 6 |
| Cylinder 5 / head 1 | 7 |
| Cylinder 6 / head 1 | 8 |
| Cylinder 6 / head 0 | 9 |
| Cylinder 5 / head 0 | A |
| Cylinder 4 / head 0 | B |
| Zone 2: | |
| Cylinder 7 / head 0 | 0 |
| Cylinder 8 / head 0 | 1 |
| Cylinder 8 / head 1 | 2 |
| Cylinder 7 / head 1 | 3 |
| Cylinder 7 / head 2 | 4 |
| Cylinder 8 / head 2 | 5 |
| Cylinder 8 / head 3 | 6 |
| Cylinder 7 / head 3 | 7 |

FIG. 5-1

| Physical Cylinder/Head | Virtual Track Number K |
|---|---|
| Cylinder 0 / head 0 | 00 |
| Cylinder 1 / head 0 | 01 |
| Cylinder 2 / head 0 | 02 |
| Cylinder 3 / head 0 | 03 |
| Cylinder 3 / head 1 | 04 |
| Cylinder 2 / head 1 | 05 |
| Cylinder 1 / head 1 | 06 |
| Cylinder 0 / head 1 | 07 |
| Cylinder 0 / head 2 | 08 |
| Cylinder 1 / head 2 | 09 |
| Cylinder 2 / head 2 | 0A |
| Cylinder 3 / head 2 | 0B |
| Cylinder 3 / head 3 | 0C |
| Cylinder 2 / head 3 | 0D |
| Cylinder 1 / head 3 | 0E |
| Cylinder 0 / head 3 | 0F |

Zone 1:

| | |
|---|---|
| Cylinder 4 / head 3 | 20 |
| Cylinder 5 / head 3 | 21 |
| Cylinder 6 / head 3 | 22 |
| Cylinder 6 / head 2 | 23 |
| Cylinder 5 / head 2 | 24 |
| Cylinder 4 / head 2 | 25 |
| Cylinder 4 / head 1 | 26 |
| Cylinder 5 / head 1 | 27 |
| Cylinder 6 / head 1 | 28 |
| Cylinder 6 / head 0 | 29 |
| Cylinder 5 / head 0 | 2A |
| Cylinder 4 / head 0 | 2B |

Zone 2:

| | |
|---|---|
| Cylinder 7 / head 0 | 40 |
| Cylinder 8 / head 0 | 41 |
| Cylinder 8 / head 1 | 42 |
| Cylinder 7 / head 1 | 43 |
| Cylinder 7 / head 2 | 44 |
| Cylinder 8 / head 2 | 45 |
| Cylinder 8 / head 3 | 46 |
| Cylinder 7 / head 3 | 47 |

FIG. 5-2

Table 3 LZT Table with Virtual Track Representation

| LZ Number | Start Virtual Track | Start LBA | Logical Sectors per track |
|---|---|---|---|
| 0 | 0 | 0 | 20 |
| 1 | 2 | 40 | 18 |
| 2 | 5 | 94 | 19 |
| 3 | 6 | 151 | 15 |
| 4 | 9 | 196 | 20 |
| 5 | 32 | 276 | 15 |
| 6 | 35 | 321 | 13 |
| 7 | 38 | 360 | 10 |
| 8 | 41 | 390 | 12 |
| 9 | 64 | 426 | 10 |
| 10 | 66 | 446 | 8 |
| 11 | 68 | 462 | 5 |
| 12 | 70 | 472 | 9 |
| 13 | 96 | 490 | - |

FIG. 6

VIRTUAL TRACK FOR SERPENTINE TRACK FORMAT

FIELD OF THE INVENTION

The present invention relates generally to data storage systems. More particularly, the present invention relates to methods of data formatting in data storage systems which employ a serpentine track format.

BACKGROUND OF THE INVENTION

One type of mass storage device is a disc drive data storage system. Disc drive data storage systems include, for example, one or more magnetic or optical storage discs. In disc drives which include multiple storage discs, the discs are mounted on a spindle for co-rotation about a central axis. Each disc surface has an associated head slider (or "head") which includes a transducer for reading data from the disc surface. Data is stored on the disc surface in circular, concentric data tracks. A "cylinder" is the set of tracks (one per each disc surface) which have the same radius from the central axis.

The data format on the disc drive is laid out in a form such that sequential addresses follow a track. At the end of a track either a head switch is performed to address the same track on an adjacent surface (another track in the same cylinder), or a track switch is performed to access an adjacent track on the same surface. This creates a serpentine track format. If the head switch takes a higher priority over the track switch (i.e., head switches are performed whenever possible), the format is called "head serpentine." On the other hand, if track switch is taken before head switch, the format is called "track serpentine." As the track density has increased significantly over the past years, the track pitch becomes increasingly smaller. As a result, the time to finish a track switch is now significantly smaller than that of a head switch, and the track serpentine format has become the preferred data format.

In head serpentine and track serpentine formats, the track and head numbers experience periodically increasing and decreasing order. The inconsistency of monotonicity causes significant computational inefficiency that is connected to the track or head numbers. This is especially true in cases where certain tables that are indexed by the track or head numbers must be searched. It is very likely that the entries in those tables must be checked one by one from the very beginning toward the ending point, until all targets have been found. As a results, efficient search algorithms, such as a binary search, cannot be employed. As the table size gets large, such searching consumes quite a lot of computation time and resources. This in turn adversely effects the performance of the drive.

Embodiments of the present invention provide solutions to these and/or other problems, and offer other advantages over the prior art.

SUMMARY OF THE INVENTION

A method of representing a serpentine track accessing format includes obtaining a plurality of head and physical track number pairs in the serpentine track accessing format. Then, each of the plurality of head and physical track number pairs are mapped to a corresponding unique virtual track number. In a multi-head disc drive data storage system, use of the unique virtual track number concepts render the multi-head drive the equivalent of a single head drive having the virtual track numbers. This in turn provides computational efficiency in table searching and other processing activities. Translation engines which perform the mapping, as well as data storage systems which include the translation engines, are also disclosed.

Other features and benefits that characterize embodiments of the present invention will be apparent upon reading the following detailed description and review of the associated drawings.

BRIEF DESCRIPTION OF THE DRAWINGS

FIG. 2-1 is a diagrammatic illustration of a serpentine track switch format traversing sequence.

FIG. 2-2 is a physical zone table.

FIG. 2-3 is a diagrammatic illustration of logical zoning.

FIG. 2-4 is a logical zone table with physical track/head representation.

FIG. 3-1 is a block diagram illustrating a method in accordance with embodiments of the present invention.

FIG. 3-2 is a block diagram illustrating a translation engine configured to implement methods of the present invention, which can be included in data storage systems.

FIG. 4-1 is a diagrammatic illustration of a serpentine track switch format with virtual track numbers assigned using a first mapping scheme in accordance with a first embodiment of the invention.

FIG. 4-2 is a diagrammatic illustration of a serpentine track switch format with virtual track numbers assigned using a second mapping scheme in accordance with a second embodiment of the invention.

FIG. 5-1 is a representation of the sequential addressing order of the physical track number and head number pairs, along with the assigned offset values of the physical tracks, in accordance with an example embodiment of the invention.

FIG. 5-2 is a representation of virtual track numbers for physical track number and head number pairs, in accordance with an example embodiment of the invention.

DETAILED DESCRIPTION OF ILLUSTRATIVE EMBODIMENTS

The present invention provides methods and apparatus which allow data storage systems to operate more efficiently. The invention includes a virtual track representation technique which is employed for disc drives with serpentine track formats. A translation engine is provided to convert a pair of physical track and head numbers into a virtual track number, and vice versa. The mechanism ensures that the virtual track number appears in a sequence of monotonically increasing order when sequential traversing is performed. This significantly improves the computational efficiency that is associated with the track and head numbers.

Figure 1:
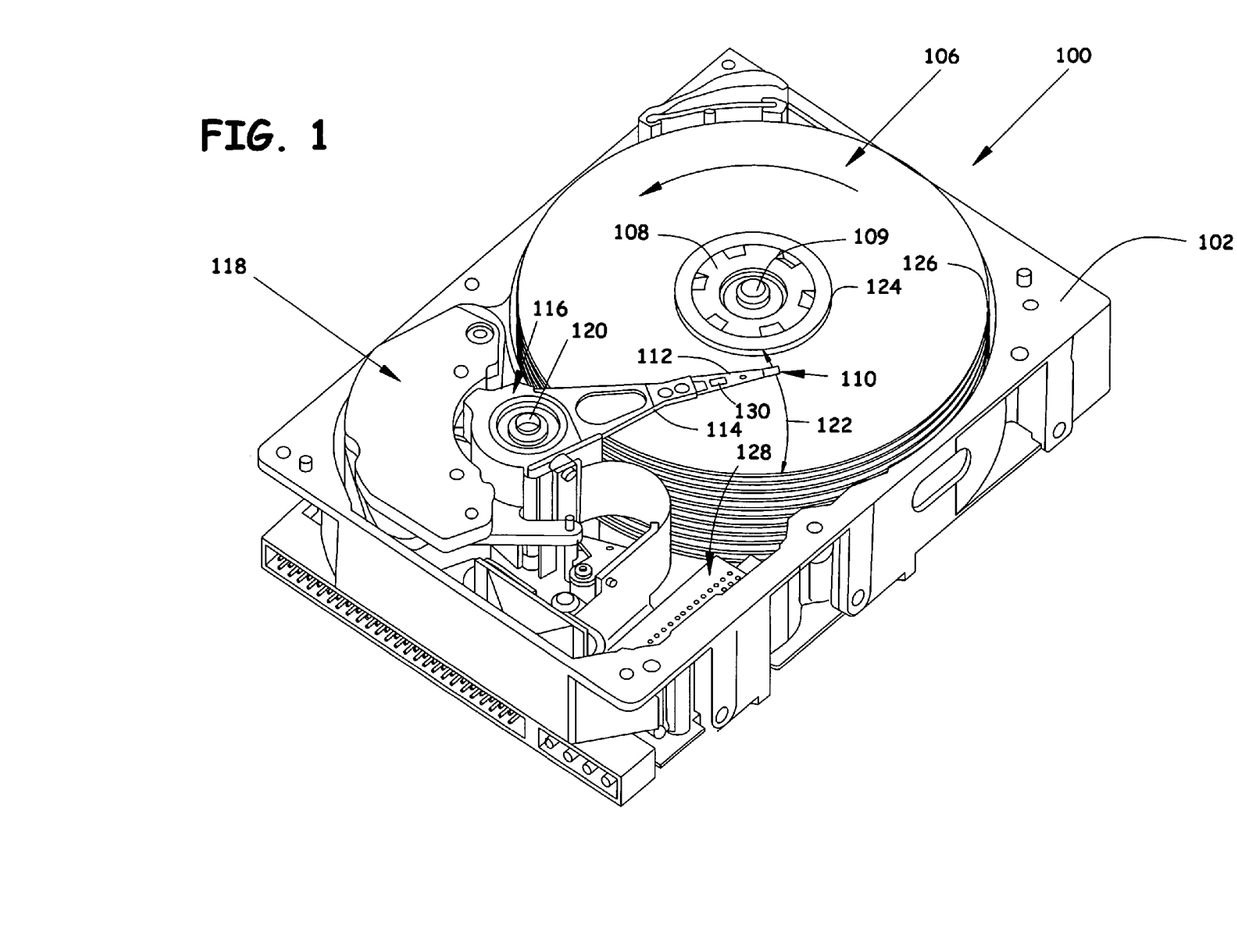
FIG. 1 is a perspective view of a disc drive type mass storage device.

Referring now to FIG. 1, a perspective view of a disc drive 100 in which the present invention is useful is shown. Disc drive 100 includes a housing with a base 102 and a top cover (not shown). Disc drive 100 further includes a disc pack 106 which is mounted on a spindle motor (not shown) by a disc clamp 108. Disc pack 106 includes a plurality of individual discs, which are mounted for co-rotation about central axis 109.

Each disc surface has an associated disc head slider 110 which is mounted to disc drive 100 for communication with the disc surface. Sliders 110 support MR heads (represented in FIG. 2) for reading data from the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a VCM, shown generally at 118. VCM 118 rotates actuator 116 with its attached head 110 about a pivot shaft 120 to position head 110 over a desired data track along an arcuate path 122 between a disc inner diameter 124 and a disc outer diameter 126. VCM 118 is driven by servo electronics (diagrammatically included within electronics 128) based on signals generated by heads 110 and a host computer (not shown). A micro-actuator 130, which provides fine position control of heads 110, is used in combination with VCM 118 that provides relatively coarse positioning of heads 110.

While disc drive 100 is shown in FIG. 1 for illustrative purposes, the present invention is not limited to use with disc drive data storage systems. Instead, the present invention applies to mass storage devices which utilize serpentine track formats.

Figure 21:
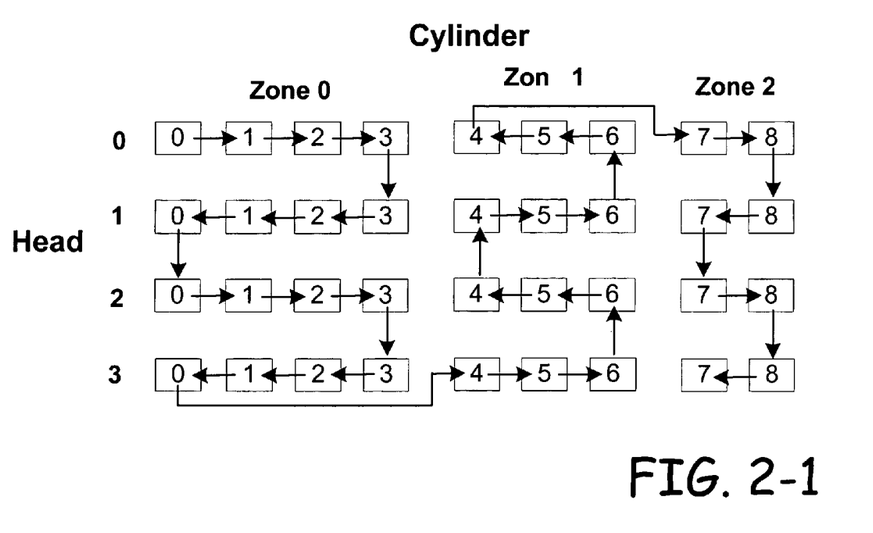
Figure 22:
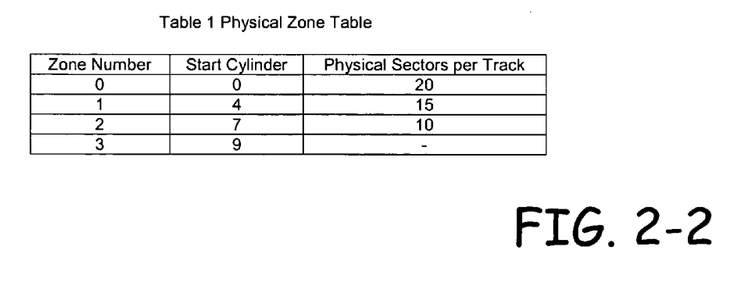

FIG. 2-1 is a diagrammatic illustration of a system having a serpentine track switch format. The example system shown in FIG. 2-1 has four recording surfaces (and corresponding heads) numbered "0" to "3". Each surface has nine data tracks numbered from "0" to "8", with similarly numbered and positioned tracks on the four recording surfaces making up similarly numbered cylinders. These track numbers, which are shown inside of blocks to illustrate the serpentine track switch format, are physical track numbers. Further, in this example, the tracks are grouped into three physical zones. A physical zone table (PZT) is used to describe the zoning status as shown in Table 1 of FIG. 2-2.

Note that the entry in Table 1 referred to as Zone Number "3" serves as a terminating record. In FIG. 2-1, horizontal arrows represent track switches by a head, and the vertical arrows represent head switches to the same track on an adjacent recording surface. In this example, beginning at head number "0" and track number "0", the arrows indicate the traversing sequence of physical tracks for a sequential data accessing. It can be seen from the sequence that the track and head numbers experience periodically increasing and decreasing order. The inconsistency of monotonicity will cause significant computational inefficiency that is connected to the track or head numbers. This is especially true in cases where certain tables that are indexed by the track or head numbers must be searched. It is very likely that the entries in those tables must be checked one by one from the very beginning toward the ending point, until all targets have been found. As discussed above, this prevents the use of some or most efficient searching algorithms. With increasing table size comes corresponding increases in computation time to perform searches. This in turn deteriorates drive's performance.

An example of a type of table which is typically indexed by track or head numbers is a logical zone table (LZT). A LZT is built on logical zoning for physical tracks. The zoning rule is that adjacent tracks that have a similar defect span are grouped into one logical zone so that the resultant logical zone will have the same number of logical sectors per track. With a LZT, the conversion between the logical block address (LBA) and the physical cylinder/head/sector (PCHS) address can be decomposed into two stages:

(I) LBA⇆Physical Cylinder/Head Logical Sector (PCHLS); and
(II) PCHLS⇆PCHS

Figure 23:
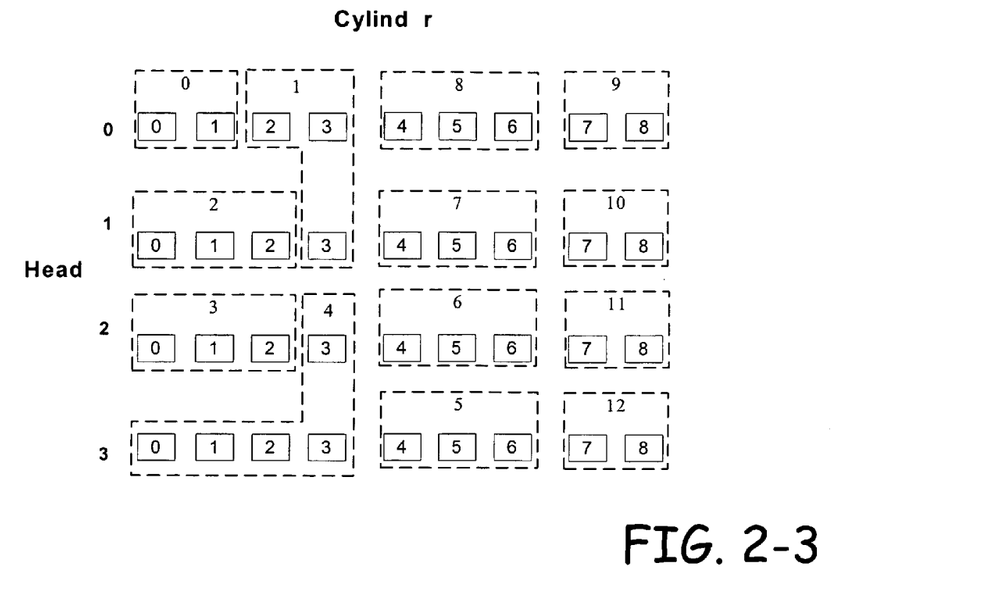
Figure 24:
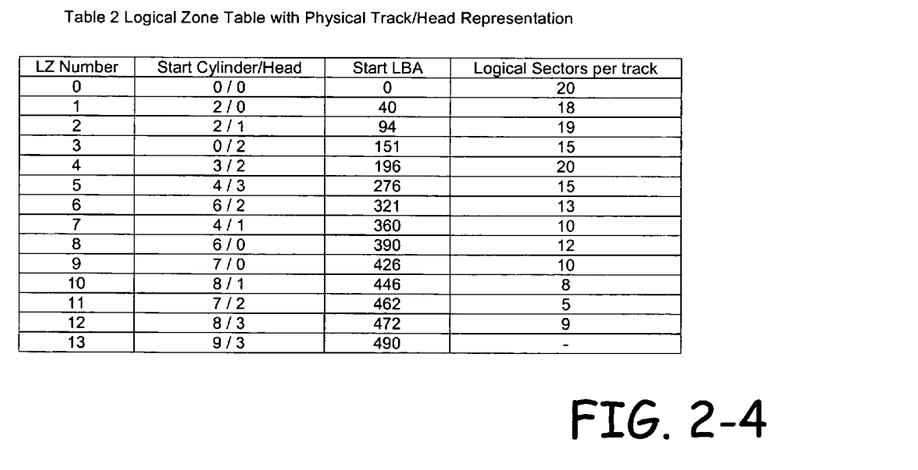

This decomposition makes the LBA⇆PCHS conversion much easier and faster, as each stage deals with different look-up tables. In stage (1), the LZT and a skip track table are needed. In stage (II) only a defect table is needed. FIG. 2-3 illustrates one possible logical zoning configuration for the example system. In FIG. 2-3, tracks within the same dashed-lined boxes belong to the same logical zone. The logical zone number is indicated at the top of each dashed-line box. One possible description of this logical zoning configuration is shown in the LZT of FIG. 2-4. Note that the entry for Logical Zone (LZ) Number 13 serves as a terminating record.

In an example embodiment, the LBA to PCHLS conversion process involves the following steps:
(1) Adjust the target LBA by skip track slips;
(2) Search the LZT table to find the first logical zone entry whose start LBA is greater or equal to the adjusted LBA;
(3) Calculate the difference between the adjusted LBA and LBA of step (2);
(4) Calculate the cylinder offset by dividing the difference of step (3) by the logical sectors per track;
(5) Determine the physical cylinder/head according to the offset value of step (4) and the start cylinder/head; and
(6) Calculate the logical sector number which is the modulo of LBA difference calculated in step (3) by the logical sectors per track;

In step (1) of the LBA to PCHLS conversion process, the phrase "skip track slip" refers to the "accumulated slips" of the skip track entry. A "skip track" is a track with excessive defects, which is totally abandoned for data usage. Generally, a skip track table is used to record such tracks. In a LZT, skip tracks are treated as normal data tracks and have the same amount of logical sectors as the other tracks within the same logical zone. Since a skip track does not contribute any logical sector, this amount of logical sectors is in fact the amount of sectors to be skipped (slipped) during translation. To avoid a LBA translated to skip tracks, each skip track entry records the "next good LBA" and "accumulated slips". The "next good LBA" is the LBA number of the first data sector that comes right after the skip track, and the "accumulated slips" indicates total skipped data sectors up to this skip track. When performing LBA to CHS conversion, the target LBA is adjusted (added) by the "accumulated slips" if it is greater than or equal to the "next good LBA" of a specific skip track entry. This way, the target LBA value has accounted for the skipped data sectors and will never be translated to skip tracks.

In step (5) of the LBA to PCHLS conversion process, each LZT entry records the physical cylinder and head of the first logical data track within the logical zone. This cylinder/head is called the start or starting cylinder/head. The start cylinder/head is determined at the time of LZT generation. In addition, each logical zone entry also records the LBA of the first data sector on the first data track within the logical zone. This LBA is called "start (starting) LBA".

An example of the LBA to PCHLS conversion process is now provided based on the LZT shown in Table 2. To simplify the illustration, it is assumed that there is no slip adjustment in step (1). The example assumes a target LBA of "217." In step (2), the logical zone entry is "4" because, in the "Start LBA" column of Table 2, "276>217>196". In step (3), the LBA difference is "21" (217−196=21). In step (4), the cylinder offset is calculated to be "1" (21÷20=1) which means the second data track within logical zone 4. In step (5), the physical cylinder/head of the second data track within logical zone 4 is cylinder 3 on head 3. In step (6), the modulo is "21 mod 20=1". Therefore the logical sector is "1". In summary, the LBA "217" will be translated to PCHLS "3/3/1".

Turning now to the PCHLS to LBA conversion process, in an example embodiment, the PCHLS to LBA conversion involves the following steps:
  (a) Search the LZT table to find the logical zone entry within which the target cylinder/head falls;
  (b) Calculate the cylinder offset of the target cylinder/head with respect to the start cylinder/head of the logical zone entry of step (a);
  (c) Calculate the LBA difference between the target cylinder/head and the start cylinder/head of the logical zone entry of step (a), which is simply the multiplication of the offset value in step (b) by the logical sectors per track;
  (d) Determine the target cylinder/head LBA by adding the start LBA of the logical zone entry and LBA difference of step (c), and the logical sector number;
  (e) Adjust the LBA of step (d) by skip track slips;

An example of the LBA to PCHLS conversion process is now provided based on the LZT shown in Table 2. To simplify the example, there is no slip adjustment in step (e). Assume that the target PCHLS is "3/3/1". The logical zone entry can be determined to be "4" in step (a). According to the serpentine format, it can be shown that "3/3/1" is on the second data track within the logical zone 4 in step (b). Therefore the cylinder offset is "1". In step (c), the LBA difference is equal to "20" (1*20=20). In step (d), the target LBA is "start LBA 196"+"LBA difference 20"+"logical sector number 1"="217".

When the start cylinder/head of a LZT entry is represented with physical values, performing step (5) of the LBA to PCHLS conversion and step (a) of the PCHLS to LBA conversion will be quite inconvenient and inefficient, due to the lack of monotonicity. The present invention addresses this problem with virtual track representation. Without virtual track representation, the numerical value of the "start cylinder/head" does not follow monotonically increasing order. As a result, it may be necessary to check each entry of the LZT to determine under which logical zone the specified target cylinder/head falls.

In accordance with methods and apparatus of the present invention, virtual track numbers are used to represent physical tracks. The virtual track numbers are chosen in a manner which results in them appearing in monotonically increasing order (but not necessarily a continuous order) as physical tracks are sequentially traversed following a serpentine format. As such, the multiple-head drive is made equivalent to a single-head drive with those virtual tracks as far as computations are concerned.

In systems and apparatus of the present invention, a translation engine is provided to convert physical track numbers into virtual ones, and vice versa. The engine functions differently for various different serpentine track switch formats, but in all embodiments operates to map a pair of physical track and head numbers into a virtual track number, and vice versa. In general, the translation algorithm used must have the following two features:
  (1) Uniqueness: Different pairs of physical track and head numbers must be mapped to different virtual track numbers; and
  (2) Monotonicity: The virtual track numbers must be in the same monotonically increasing order as the sequential traversing sequences.

Figure 31:
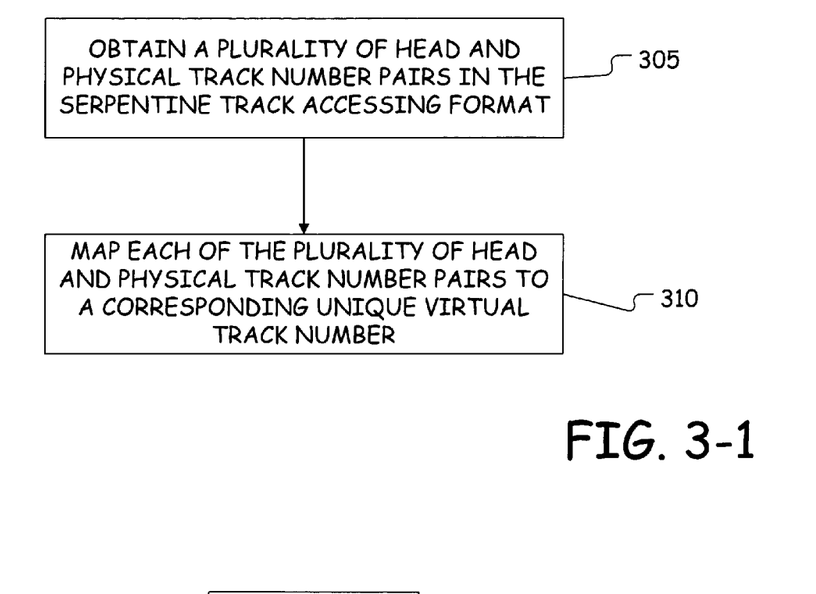
Figure 32:
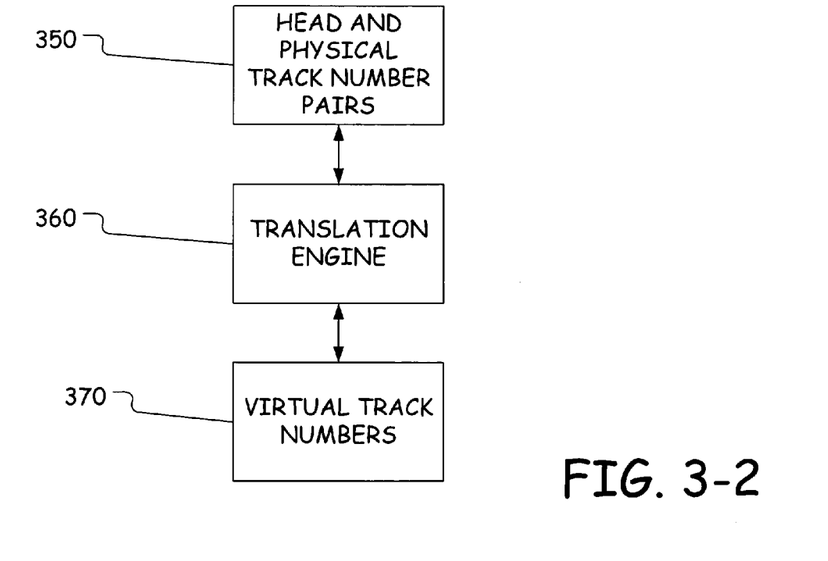

FIG. 3-1 is a flow diagram illustrating a method of the present invention. As such, the method includes the step shown at block 305 of obtaining a plurality of head and physical track number pairs in the serpentine track accessing format. The method then includes the step shown at block 310 of mapping each of the plurality of head and physical track number pairs to a corresponding unique virtual track number. FIG. 3-2 is a block diagram which illustrates translation engine 360 configured to implement the methods of the present invention, and which can be included in disc drive data storage system 100. Translation engine 360 obtains the head and physical track number pairs 350 in the serpentine track accessing format. Translation engine 360 then maps these pairs to virtual track numbers 370, and vice versa. More specific embodiments of the method shown in FIG. 3-1, and thus the configuration of translation engine 360, are described below.

Figure 41:
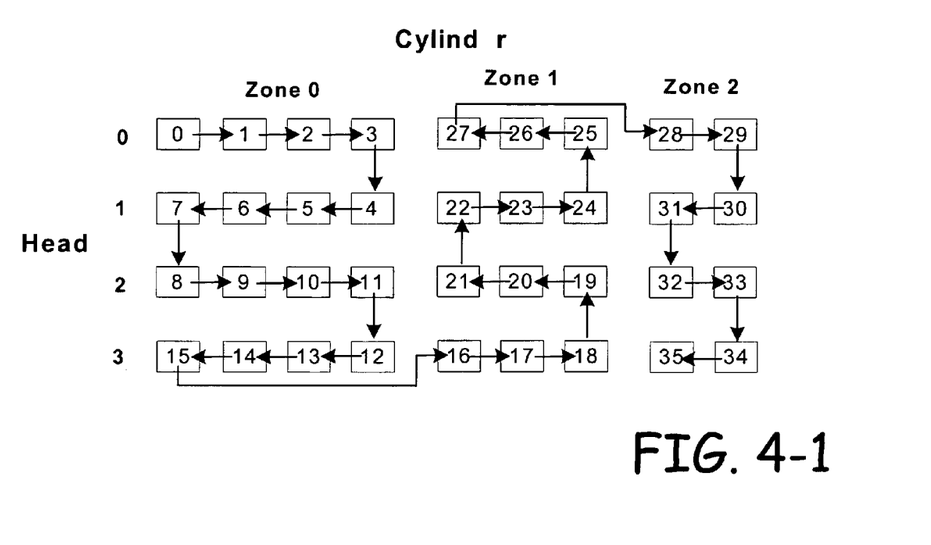

One method of mapping the pairs of physical track and head numbers to virtual track numbers which satisfies these two criteria is to number the tracks of the serpentine traversing sequences sequentially, assigning the virtual track numbers one by one to the physical tracks along the traversing sequence. For example, FIG. 4-1 illustrates the serpentine track switch format shown in FIG. 2-1, but with the physical track numbers replaced by virtual track numbers which are exactly equal to the track traversing order under the serpentine track switch format. In this example embodiment, the virtual track number sequence begins with "0", but this need not necessarily be the case. Note that unlike the physical track numbers shown in FIG. 2-1, the virtual track numbers are unique. In other words, the virtual track numbers appear only once, regardless of head number.

The present invention is not limited to the method of mapping the pairs of physical track and head numbers to virtual track numbers illustrated in FIG. 4-1. Other methods can also be used. One point to consider in selecting the mapping scheme and method is that conversion from virtual track number to physical track/head numbers must be optimized to be as fast as possible as it is frequently performed at run-time (during operation of the drive). For this reason, another translation scheme and method are proposed. Embodiments of this alternate translation method include the following steps:
  (1) Select a modulo M which satisfies M≧(Maximum Tracks per Physical Zone per Head)*Total Heads;
  (2) Within a physical zone assign each track an offset value N (N≦M-1) sequentially and continuously (for example, N starts from 0 for the first sequential track of the zone);
  (3) Assign each physical zone a value P which reflects its traversing sequence (for simplicity, P can be chosen to be equal to the physical zone index value); and
  (4) Combine P and N within one number K (for example, P can take the higher bits of K, and N can take the lower bits of K).

Figure 42:
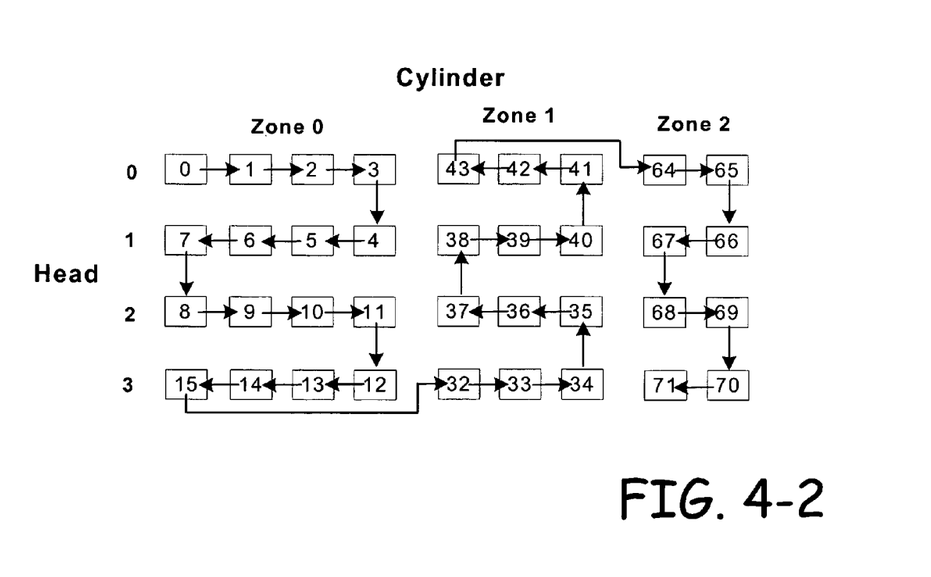

The number K obtained in step (4) is the resultant virtual track number. FIG. 4-2 provides an example of the results of this translation method for the example system and serpentine track switch format shown in FIG. 2-1. In this example, M is set equal 32. The virtual track number is then encoded into an 8-bit length byte, with the lower five bits allocated for the offset N, and the higher three bits allocated for the zone number value P. In FIG. 4-2, the virtual track numbers are shown in decimal. A detailed explanation of how these method steps are used to determine the virtual track numbers shown in FIG. 4-2 is now provided.

Figure 51:
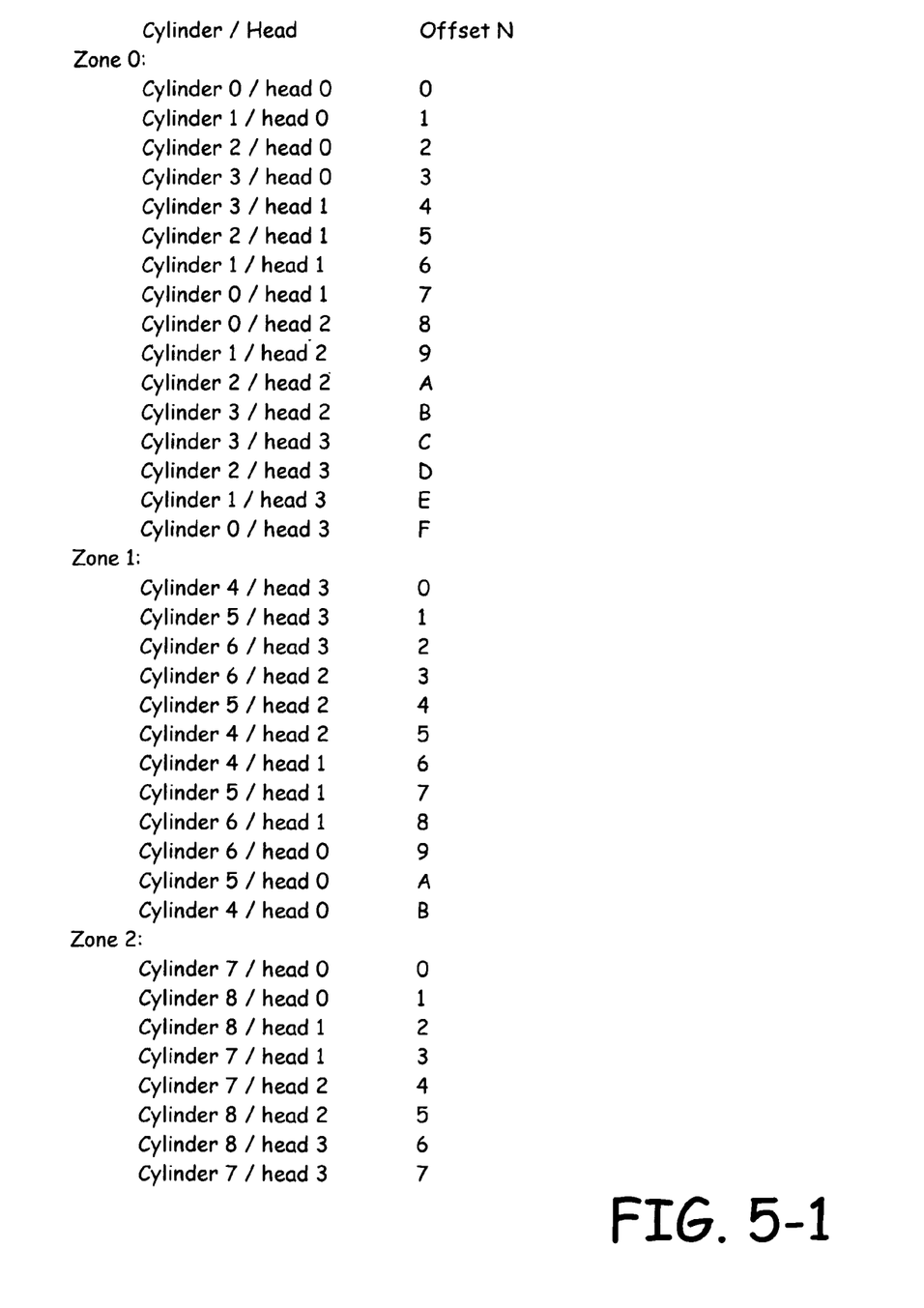

The following example demonstrates virtual track number encoding in 8-bit length bytes for the serpentine track switch format FIG. 2-1. In step (1), Zone 0 has the maximum number of tracks per head, which is 4. As there are 4 heads, the maximum total tracks per zone is 16. Therefore M can be selected to be 32, which takes 5 bits to represent. For step (2), the sequential addressing order of the physical track number (represented by cylinder number) and head number pairs, along with the assigned offset values N (in hexadecimal) of the physical tracks, are as shown in FIG. 5-1.

Figure 52:
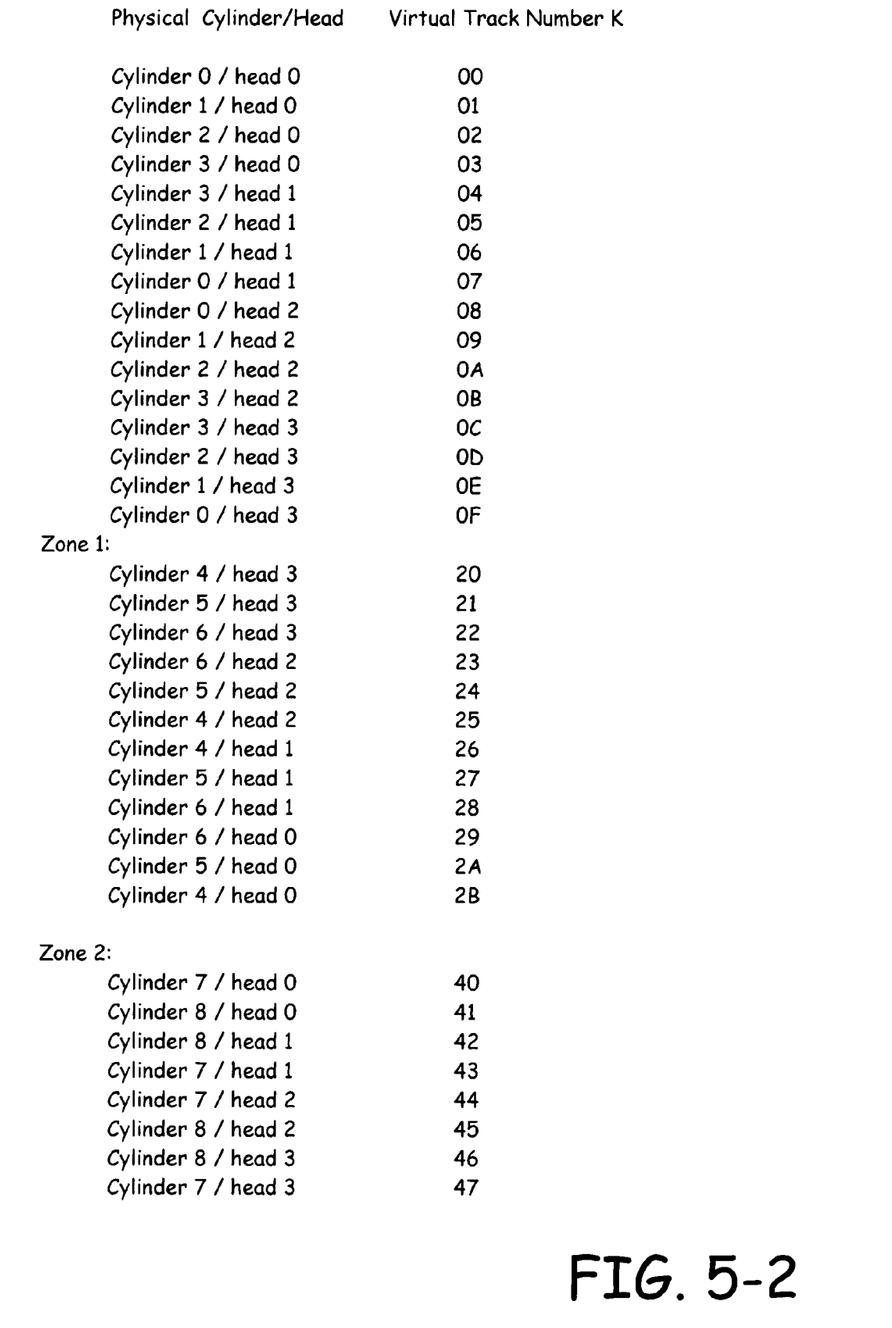

For step (3), it can be seen from FIG. 2-1 that the traversing sequence for the three physical zones is "zone 0"→"zone 1"→"zone 2". Therefore, "P" for these zones is set as 0, 1, and 2, respectively. In this example, three bits are allocated to represent "P" values. In step (4) the numbers P and N are combined within one number K. Again, in this particular example, P takes the higher bits of K, and N takes the lower bits of K. The combination results (virtual track numbers in hex) are shown in FIG. 5-2. For a specific example, consider the combination of physical track number "7" and head number "1" from FIG. 2-1. Using the offset N of "3" as shown in FIG. 5-1 for the lower five bits (i.e., "00011") and the value P of "2" (i.e., "010") for the upper three bits results in an eight-bit virtual track number of "01000011" (which is hexadecimal "43").

The translation scheme and method which results in the serpentine track switch format shown in FIG. 4-2 provides some advantages that can significantly improve computational efficiency. In this case the physical zone number is readily available within the virtual track number, while table searching must be performed to identify the physical zone number using the virtual track number mapping scheme shown in FIG. 4-1. This saves both code space and conversion speed. For practical systems with 16-bit disc controllers, a 24-bit length number can be used to represent the virtual track. The lower 16-bit word is used to encode the offset value N, and the higher 8 bits is used to encode the zone number P. Since 16 bits can encode or represent offset values from 0-FFFF (hex), which means that a maximum of 65536 (decimal) tracks within one physical zone can be represented, this implies a maximum physical zone number of 256, and a maximum tracks per zone per head of 16384 for 4-head drives. These numbers are both more than enough for encoding current drives.

Figure 6:
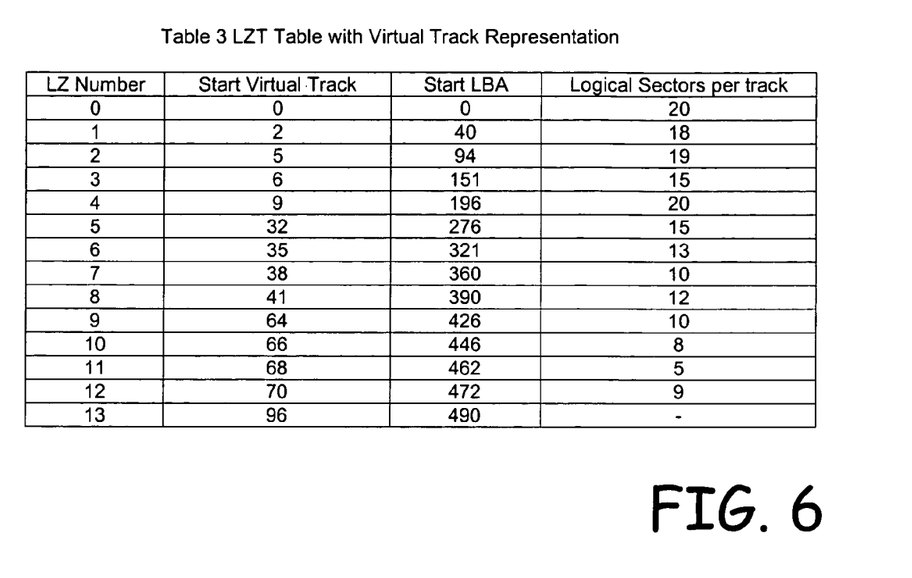
FIG. 6 is a logical zone table with virtual track representation.

With the proposed virtual track representation, the LZT table can now be represented as shown in Table 3 shown in FIG. 6. Virtual track representation can also be used in other lookup tables, such as skip track tables, and other types of serpentine schemes. Although not discussed here in detail, the principles for applying virtual track representation to other types of tables are the same.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the mass storage device or system while maintaining substantially the same functionality without departing from the scope and spirit of the present invention. In addition, although the preferred embodiment described herein is directed to a disc drive data storage system type of mass storage device, it will be appreciated by those skilled in the art that the teachings of the present invention can be applied to any mass storage devices which utilizes a serpentine track sequencing format, without departing from the scope and spirit of the present invention. Further, while two mapping schemes and corresponding specific method steps were described for illustrative purposes, those skilled in the art will recognize that the methods of the present invention are not limited to these specific example embodiments.

What is claimed is:

1. A method of representing a serpentine track accessing format, the method comprising:
   obtaining a plurality of head and physical track number pairs in the serpentine track accessing format; and
   mapping each of the plurality of head and physical track number pairs to a corresponding unique virtual track number, wherein the virtual track numbers have a non-continuous monotonic order as the head and physical track number pairs are sequentially traversed in the serpentine track accessing format.

2. The method of claim 1, wherein the non-continuous monotonic order is a non-continuous monotonically increasing order.

3. The method of claim 1, wherein the serpentine track accessing format is a track serpentine format.

4. The method of claim 1, and further comprising storing virtual track numbers in a table such that the table is indexed by the virtual, track numbers.

5. The method of claim 4, and further comprising searching the table using virtual track numbers as the search parameter.

6. A translation engine configured to implement the method of claim 1.

7. A multi-head disc drive data storage system including the translation engine of claim 6, wherein mapping each of the plurality of head and physical track number pairs to corresponding unique virtual track numbers makes the multi-head drive a functional equivalent of a single head disc drive data storage system having the virtual track numbers.

8. A method of representing a serpentine track accessing format, the method comprising:
   obtaining a plurality of head and physical track number pairs in the serpentine track accessing format; and
   mapping each of the plurality of head and physical track number pairs to a corresponding unique virtual track number, comprising:
      selecting a modulo M as a function of a maximum number of tracks per physical zone;
      within each physical zone, assigning each physical track an offset value N sequentially, wherein offset value N is less than or equal to M−1;
      assigning each physical zone a unique value P which reflects its traversing sequence; and
      for each physical track, combining its offset value N and the unique value P assigned to its corresponding physical zone to obtain the corresponding unique virtual track number K.

9. The method of claim 8, wherein assigning each physical track the offset value N sequentially further comprises assigning each physical track the offset value N continuously starting from zero for a first sequential mack of the corresponding zone.

10. The method of claim 8, wherein the unique value P assigned to each physical zone is equal to a physical zone index value.

11. The method of claim 8, wherein for each physical track, combining its offset value N and the unique value P assigned to its corresponding physical zone to obtain the corresponding unique virtual track number K further comprises allocating a first number of bits of the virtual track number K to represent the offset value N, and allocating a second number of bits of the virtual track number K to represent the unique value P assigned to its corresponding physical zone.

12. The method of claim 8, wherein selecting the modulo M further comprises selecting the modulo M such that it is greater than or equal to a maximum number of tracks per physical zone per head multiplied by a total number of heads.

13. A data storage system comprising:
   a plurality of recording surfaces, with each recording surface including a plurality of physical data tracks;
   a plurality of heads, with each of the plurality of heads positioned adjacent to one of the plurality of recording surfaces, thereby forming a plurality of head and physical track number pairs in a serpentine track accessing format; and
   a translation engine configured to obtain the plurality of head and physical track number pairs in the serpentine track accessing format, and to map each of the plurality of head and physical track number pairs to a corresponding unique virtual track number by assigning the unique virtual track number in a manner which results in the virtual track numbers being in a non-continuous monotonic order as the head and physical track number pairs are sequentially traversed in the serpentine track accessing format.

14. The data storage system of claim 13, wherein the non-continuous monotonic order is a non-continuous monotonically increasing order.

15. The data storage system of claim 13, wherein the translation engine is configured to assign the unique virtual track numbers by performing steps comprising:
   selecting a modulo M as a function of a maximum number of tracks per physical zone;
   within each physical zone, assigning each physical track an offset value N sequentially, wherein offset value N is less than or equal to M−1;
   assigning each physical zone a unique value P which reflects its traversing sequence; and
   for each physical track, combining its offset value N and the unique value P assigned to its corresponding physical zone to obtain the corresponding unique virtual track number K.

16. The data storage system of claim 15, wherein the translation engine is configured to perform the step of selecting the modulo M by selecting the modulo M such that it is greater than or equal to a maximum number of tracks per physical zone per head multiplied by a total number of heads.

* * * * *